United States Patent [19]

Narayanan et al.

[11] Patent Number: 5,362,698
[45] Date of Patent: Nov. 8, 1994

[54] FREE RADICAL INITIATOR DELIVERY SYSTEM

[75] Inventors: Kolazi S. Narayanan, Palisades Park; Waldo De Thomas, Morristown, both of N.J.

[73] Assignee: ISP Investments Inc., Wilmington, Del.

[21] Appl. No.: 44,136

[22] Filed: Apr. 8, 1993

[51] Int. Cl.$^5$ .................. B01J 37/03; B01J 31/00; C08F 26/10
[52] U.S. Cl. .................. 502/151; 502/167; 502/172; 526/264
[58] Field of Search .............. 526/262, 264; 502/151, 502/167, 172

[56] References Cited

U.S. PATENT DOCUMENTS 3,862,915  1/1975  Fried et al. .................. 526/264

Primary Examiner—Joseph L. Schofer
Assistant Examiner—Wu C. Cheng
Attorney, Agent, or Firm—Marilyn J. Maue; Joshua J. Ward

[57] ABSTRACT

This invention relates to a process for preparing an improved polymerization free radical initiator delivery system for the polymerization of a monomer containing olefinic unsaturation which comprises uniformly dispersing a water insoluble free radical initiator, an excess amount of the polymeric product of the reaction and between about 1.0 and about 100 wt. % of a surfactant based on initiator in water to form an aqueous mixture containing between about 5 and about 40 wt. % solids; subjecting the dispersion to treatment at a temperature of between about −25° C. and about 0° C. under from about 50 to about 400 milli Tort vacuum for a period of from about 5 to about 24 hours to remove water and to form uniform coprecipitated initiator/polymer microparticles having an average particle diameter of between about 0.001 and about 100 microns and then diluting the coprecipitated microparticles with water under vigorous agitation to form a microparticulate dispersion of low viscosity containing from about 5 to about 40 wt. % solids which is suitable as the initiator feed for contacting said monomer in a polymerization reaction.

25 Claims, No Drawings

FREE RADICAL INITIATOR DELIVERY SYSTEM

A major difficulty encountered with many polymerization initiators, such as the peroxy and azo initiators, is their insolubility in reaction media. In carrying out polymerizations, particularly in those polymerizations which employ continuous or timed addition, these initiators must be solubilized in order to be effective. Some processes have used predissolution of initiator in mineral spirits or other organic solvents; however, these additives cause product quality problems which are not easily rectified. To overcome this difficulty, predissolution of the initiator in monomer has been employed, but this solution leads to other difficulties involving highly reactive vinyl monomers, such as vinyl lactams, vinyl acetate, maleic arthydride, acrylates and the like, which rapidly polymerize and cause polymer plugging in the pumps, valves and feed lines of the process unless close temperature control and other reaction parameters are closely maintained.

The initiator feed preparation disclosed in U.S. Pat. No. 3,862,915 suggests suspending crystalline azo type initiators in an 0.5–30% aqueous solution of polymer. However, the initiator feed prepared by this method has not found general acceptance since such suspensions are relatively unstable and the presence of suspended initiator has the tendency toward early termination of the desired monomeric polymerization reaction. Also the initiator crystals in the suspension are not employed at maximum efficiency since the crystalline size does not approach microcrystallization which is desired for higher efficacy.

Accordingly, it is an object of the present invention to overcome the above difficulties by providing a process for the preparation of an efficient, commercially feasible free radical initiator delivery system useful in the homo- and co- polymerization of olefinic monomers.

Another object of this invention is to provide a highly stable initiator feed in liquid form which avoids the presence of any extraneous solvent or diluent in the polymerization reaction.

These and other objects will become apparent from the following description and disclosure.

THE INVENTION

In accordance with this invention, there is provided a process for the preparation of a coprecipitated microparticulate dispersion of a polymer/free radical initiator delivery system for the polymerization of a monomer containing olefinic unsaturation which comprises, dispersing a water insoluble free radical initiator, an excess amount of a polymeric product of said polymerization reaction and between about 1.0 and about 100 wt. % of a surfactant based on said initiator in water to form an aqueous mixture containing between about 5 and about 40 wt. % solids; agitating the resulting aqueous mixture to obtain uniform distribution of polymer and initiator molecules; removing the water dispersant to provide a coprecipitated, solid mixture of initiator and polymer in the form of microparticles of between about 0.001 and about 100 micron size by subjecting the aqueous dispersion to treatment at a temperature of between about $-25°$ C. and about $0°$ C. under from about 50 to about 400 milli Torr vacuum for a period of from about 5 to about 24 hours and then dispersing the coprecipitated microparticles in water under vigorous agitation to form a stable, microparticulate dispersion containing between about 5 and about 40 wt. % solids which is suitable as an initiator feed for contact with said monomer in a polymerization reaction.

Any of the various water insoluble free radical initiators, particularly the solid initiators, can be employed as the initiator feed composition in the above process. Examples of suitable initiators include the free radical peroxy and azo type compounds, such as azodiisobutyronitrile (VAZO-64), azodiisovaleronitrile (VAZO-52), dimethylazodiisobutyrate (WAKO 601), 2,2'-azobis(isobutyronitrile), 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramidine), 1,1'-azobis(1-cyclohexanecarbo-nitrile), 4,4'-azobis(4-cyanopentanoic acid), 2,2'-azobis (isobutyramide)dihydrate, 2,2'-azobis(2-methylpropane), 2,2'-azobis(2-methylbutyronitrile), VAZO 67, cyanopentanoic acid, the peroxy pivalates, dodecylbenzene peroxide, benzoyl peroxide, di-t-butyl hydroperoxide, t-butyl peracetate, acetyl peroxide, dicumyl peroxide, cumyl hydroperoxide, dimethyl bis(butylperoxy) hexane and generally any of the solid or liquid oil-soluble free radical initiators conveniently employed for polymerizations involving monomers containing olefinic unsaturation.

In the above preparation of the initiator/polymer feed, the surfactant can be added separately, or with the free radical initiator or with water and is preferably used in an amount not exceeding 50 wt. %, more desirably not more than about 30 wt. %, with respect to initiator. The surfactant or a mixture of surfactants have been found to minimize emulsion particle or droplet size in the aqueous dispersion product. Further, the surfactant materially alters the solubility of the initiator and brings the polymer and initiator into more intimate contact prior to coprecipitation. The amount of surfactant added is preferably between about 5.0 and about 50 wt. %, most preferably between about 10 and about 30 wt. %, based on initiator. Suitable surfactants include N-$C_8$ to $C_{12}$ alkyl pyrrolidones, $C_{10}$ to $C_{18}$ alkyl sulfates, e.g. sodium dodecyl sulfate, polyglycerides, ethoxylated alcohols or acids and ethoxylated or propoxylated alkyl phenols containing an average of from 6 to 50 alkoxy units, e.g. average 9 ethoxylated nonyl phenol (Igepal ® CO-630) and average 40 ethoxylated nonyl phenol (Igepal ® CO-890) and mixtures of these surfactants.

The polymer which is initially dispersed in water with the initiator and surfactant can be any homopolymer or copolymer of a $C_1$ to $C_4$ alkenyl monomer polymerized product which includes the polymers of vinyl, propenyl, etc. containing monomers such as N-vinyl pyrrolidone, N-vinyl caprolactam, vinyl acetate, alkyl vinyl ethers, styrene, isoprene, maleic acid, maleic anhydride, lower alkyl acrylates or methacrylates and the like, as well a copolymer or terpolymer involving mixtures of these or other monomers, such as dialkylaminoalkyl acrylates or methacrylates, butadiene, amides, methacrylamides and vinyl propenyl ethers.

The initiator and polymer are introduced and coprecipitated in a weight ratio of between about 1:5 and about 1:1.5; a ratio of between about 1:3 and about 1:2.5 being preferred. It is to be understood that the polymer dispersed with initiator in the delivery system can be the homopolymer of only one of the monomers subsequently employed in the copolymerization process or it can be the copolymeric, or terpolymeric product of the reaction. Thus, in the polymerization of N-vinyl pyrrolidone, N-vinyl caprolactam and dimethylaminoethylmethacrylate, the polymer mixed with initiator may be the homopolymer of vinyl pyrrolidone alone, the homopolymer of vinyl caprolactam alone, the copolymer of vinyl pyrrolidone and vinyl caprolactam or the terpolymeric product of the polymerization reaction. Generally it is preferred that the polymer mixed with initiator in the delivery system is the product of the polymerization process. The number average molecular weight of the polymer employed in the delivery system, can vary over a wide range, e.g. from about 3,000 to about 1,000,000, more desirably from about 10,000 to about 500,000; however, the polymer should be one which has a viscosity capable of intimate mixing with initiator in the aqueous dispersant.

The polymer and initiator are initially dispersed in between about 5 and about 15 parts, preferable between about 8 and about 12 parts by weight of water, based on initiator. In the process water can be added to the polymer and initiator or the polymer and initiator can be added to water in a convenient mixing device. In both cases thorough mixing is required to obtain uniform distribution of the components before freezing.

The low temperature treatment of the present process is preferably carried out at a temperature of from about $-15°$ C. to about $0°$ C. under between about 100 and about 300 milli Tort vacuum for a period of from about 12 to about 18 hours, in the presence or absence of agitation. During the freezing operation, water is removed and the initiator and polypher are coprecipitated to form discrete particles, preferably in the form of a powder. It is recommended, but not essential, that the aqueous dispersion be subjected to gradual cooling to $0°$ C. or below since this practice favors smaller coprecipitated particles and ensures more efficient use of the initiator during the ensuing polymerization of monomer. The coprecipitation of the initiator with polymer is essential to attaining intimate contact and homogeneous distribution of the species which factors ensure stability in the final initiator feed which is produced as an aqueous dispersion of the coprecipitate.

After the water is removed during the freezing operation, the final dispersion of the present invention is formed by the addition of from about 60 to about 95 parts by weight of water, preferably from about 70 to about 85 parts by weight of water, under vigorous agitation. Coprecipitated particles containing surfactant, preferably of between about 0.1 and about 50 micron diameter, are thus prepared as a stable aqueous dispersion which can then be suitably employed as the initiator feed to a free radical polymerization reaction and may be introduced at the beginning or gradually throughout the ensuing polymerization process. The viscosity of the dispersion is such that the feed may be easily pumped into the reactor; in this regard a Brookfield viscosity of from about 60 cps to about 50,000 cps can be obtained, although a viscosity of from about 600 to about 20,000 cps is preferred and from about 1,000 to about 10,000 cps is most preferred.

The total amount of initiator/polymer/surfactant dispersion used in the polymerization reaction is within the conventional range of from about 0.01 to about 3.5 wt. %, more often from about 0.02 to about 1.5 wt. %, based on initiator to total monomer.

Particularly preferred applications of the present coprecipitated initiator/polymer/surfactant dispersion include the homopolymerization of N-vinyl pyrrolidone using dimethyl 2,2'-azobis-isobutyrate (WAKO 601) initiator and a poly(N-vinylpyrrolidone) having a number average molecular weight of from about 5,000 to about 600,000 in the dispersed feed or the copolymerization of N-vinyl pyrrolidone with vinyl ester, acrylate, methacrylate, acrylamide and methacrylamide using 2,2'-azobis(2-methylbutyronitrile (VAZO 67), azodiisobutyronitrile (VAZO 64) as the initiator or azodiisovaleronitrile (VAZO 52) and the above N-vinyl pyrrolidone homopolymer in the pumpable dispersion feed to the polymerization reactor.

The present initiator delivery system posesses many advantages over those of the art in that no extraneous compounds are introduced into the polymerization reaction mixture. Also, the dilution of the stable coprecipitated particles can be easily regulated to meet the needs of the reaction and avoid plugging of apparatus. Additionally, the microparticulate size in the dispersion ensures maximum efficiency of initiator properties.

Having thus generally described the invention, reference is now had to the following examples which illustrate specific and preferred embodiments but which are not to be construed as limiting to the scope of the invention as more broadly set forth above and in the appended claims.

EXAMPLE 1

To a 20 liter reactor was charged 3077 grams of deionized water, 1033 grams of vinylpyrrolidone, 4.6 grams of ammonium hydroxide (28% aqueous), and 0.45 grams of tetrasodium ethylenediamine tetraacetic acid (EDTA). The mixture was purged with nitrogen to remove air while agitating at 250 rpm's and then heated to $75°$ C.

In a separate vessel, 3.1 grams of WAKO 601 initiator, 1.0 g of Igepal ® CO-630 surfactant and 9.3 grams poly(N-vinylpyrrolidone), i.e. PVP, having a K-value of 80 were uniformly dispersed in 25 grams of water during constant agitation over a period of 1 hour. The resulting dispersion at room temperature was then gradually cooled over a 2 hour period in a freeze dryer to a temperature of $-5°$ C. under a vacuum of 200 milli Torr. The mixture was held at this temperature and pressure for 16 hours, during which water was vaporized and removed. The resulting coprecipitated initiator/polymer/surfactant particles, of about 20 micron size, were then dispersed in 30 grams of water. With the polymerization reactor at $75°$ C. and under constant agitation, the coprecipitated dispersion was added. After 30 minutes, 7535 grams of water and 2297 grams of vinylpyrrolidone was pumped over a 2 hour period into the reactor at a rate of 80 ml/hr. and after an additional 30 minutes, another initiator/polymer/surfactant dispersion charge was made. This second dispersion charge was gradually introduced over a period of 4 hours and was separately prepared as described above except that 6.0 grams of WAKO 601, 18 grams of PVP and 50 grams of deionized water were used. The resulting reaction mixture was then held for an additional hour at $75°$ C. before being discharged from the reactor. The resulting PVP reaction product solution, at 24.34% polymer concentration, had a K-value of 85.

EXAMPLE 2

Example 1 was repeated except that VAZO 67 initiator was substituted for WAKO 601. The polymeric reaction product solution, about 25% solids, had a K-value of 83.

EXAMPLE 3

Example 1 was repeated except that 0.33 grams of Igepal ® CO-630 was added to the initial mixture of initiator, polymer and water and 0.68 grams of Igepal ® CO-630 was added to the second dispersion charge. The resulting PVP reaction product solution contained 25% solids and had a polymer K-value of 85.

The results are substantially the same when an aqueous 10:1 mixture of N-octyl pyrrolidone and sodium dodecyl sulfate is substituted for Igepal ® CO-630 as the surfactant in the initial dispersion.

EXAMPLE 4

To a 20 liter reactor was charged 11,305 g of deionized water and 2179 g of vinylpyrrolidone. Using a continuous nitrogen purge, the mixture was heated to 61°–62° C. While heating, 27 grams of dimethyl amino ethyl methacrylate was quickly charged to the mixture over a 5 minute period.

In a separate vessel, 0.4 g of t-butylperoxy pivalate initiator, 1.5 g of PVP K-30, and 0.2 g of Igepal ® CO-630 surfactant were uniformly dispersed in 3.5 g of water by constant agitation over a 1 hour period. The resulting dispersion at room temperature was then gradually cooled over a 2 hour period in a freeze dryer to a temperature of −5° C. under a vacuum of 200 milli Torr. The mixture was held at this temperature and pressure for 16 hours, during which water was vaporized and removed. The resultant coprecipitated initiator/polymer/surfactant particles of about 30 micron size were then dispersed in 4.0 g of water. With the polymerization reactor at 61°–62° C., the coprecipitated dispersion was then added to the polymerization mixture. At the same time 518 g of dimethyl-aminoethyl-methacrylate was pumped in at a rate of 6.5 g/minute over a 1 hour and 20 minute period. Another initiator/polymer/surfactant charge was made identical to the first charge and this was added to the polymerization mixture. After 20 minutes a third dispersion charge identical to the previous was added to the polymerization mixture. This initiator addition was repeated for a total of 6 initiator/polymer/surfactant charges. The mixture was then held for 2 hours at 61°–65° C., then allowed to cool to 43°–47° C. During the cooling period 262 g of diethyl sulfate was added. Stirred for 1 hour at 43°–47° C. to complete the polymerization. The resulting copolymer had a solids content of 19.4%, a viscosity of 1.8 (Ostwald-Fenske), and a molecular weight greater than 1,000,000.

While the invention has been described with particular reference to certain embodiments thereof, it will be understood that changes and modifications may be made which are within the skill of the art and the scope of this invention.

What is claimed is:

1. The process for the preparation of a coprecipitated free-radical initiator delivery system for the polymerization of a monomer containing olefinic unsaturation which comprises:

(a) dispersing in water with agitation, in a weight ratio of from about 1:5 to about 1:1.5, a water insoluble free radical initiator and a polymer of a monomer employed in said polymerization reaction in the presence of from about 1.0 to about 100 wt. % of a surfactant, based on the weight of initiator to form a first dispersion, (b) removing water by subjecting said dispersion to a temperature of between about 0° C. and about −25° C. under from about 50 to about 400 milli Torr vacuum for a period of from about 5 to about 24 hours to form uniformly coprecipitated initiator-polymer solid microparticles and (c) adding water to said coprecipitated microparticles with vigorous agitation in an amount sufficient to form a pumpable liquid and to form a stable second aqueous dispersion of coprecipitated microparticles containing surfactant having an average diameter of from about 0.001 to about 100 microns.

2. The process of claim 1 wherein water is added in step (c) to provide a dispersion of from about 5 to about 40 wt. % solids.

3. The process of claim 1 wherein water is added in step (c) to provide a dispersion of from about 15 to about 30 wt. % solids.

4. The process of claim 1 wherein step (b) is carried out at a temperature of from about −15° C. to about 0° C. under from about 100 to about 300 milli Torr vacuum.

5. The process of claim 1 wherein a surfactant is added in step (a) and the amount of surfactant used is between about 10 and about 30 wt. % based on initiator.

6. The process of claim 5 wherein the amount of surfactant used is between about 5 and about 50 wt. % based on initiator.

7. The process of claim 6 wherein said surfactant is selected from the group consisting of a N-$C_8$ to $C_{12}$ alkyl substituted pyrrolidone, ethoxylated alcohol or acid, a polyglyceride, an ethoxylated or propoxylated alkyl phenol containing an average of from 6 to 50 alkoxy units, a $C_{10}$ to $C_{14}$ alkyl metal sulfate and mixtures thereof.

8. The process of claim 7 wherein said surfactant is ethoxylated nonyl phenol.

9. The process of claim 7 wherein said surfactant is an aqueous mixture of N-octyl pyrrolidone and sodium dodecyl sulfate.

10. The process of claim 1 wherein the initiator and polymer in step (a) are combined in a weight ratio of between about 1:3 and about 1:2.5.

11. The process of claim 1 wherein step (b) is effected by gradually cooling the dispersion of step (a) to a temperature of between about −15° C. and about 0° C. over a period of several hours.

12. The process of claim 11 wherein said gradual cooling is carried out with agitation.

13. The process of claim 11 wherein step (b) is effected at a temperature of between about −15° C. and about 0° C. under from about 100 to about 300 milli Torr vacuum for a period of from about 12 to about 18 hours.

14. The process of claim 1 wherein the dispersion of step (c) contains coprecipitated microparticles of from about 0.1 to about 50 microns.

15. The process of claim 1 wherein said polymer in step (a) has a number average molecular weight of between about 3,000 and about 1,000,000.

16. The process of claim 15 wherein said polymer has a number average molecular weight of between about 10,000 and about 500,000.

17. The process of claim 1 wherein said polymerization reaction is the polymerization of a monomer having olefinic unsaturation and the polymer combined with said initiator in step (a) is the polymer of a monomer in the polymerization reaction.

18. The process of claim 1 wherein said polymerization is the polymerization a of N-vinyl pyrrolidone monomer and the polymer combined with initiator in step (a) is a polymer of N-vinyl pyrrolidone.

19. The process of claim 18 wherein the polymerization reaction is the homopolymerization of N-vinylpyrrolidone and the polymer coprecipitated with the initiator is poly(N-vinylpyrrolidone).

20. The process of claim 1 wherein said polymerization reaction is the polymerization of two monomers containing olefinic unsaturation and the polymer combined with said initiator in step (a) is the copolymer of said monomers.

21. The process of claim 1 wherein said initiator is an azobis($C_4$ to $C_5$ alkylnitrile).

22. The process of claim 1 wherein said initiator is azobis(methylbutyronitrile).

23. The process of claim 1 wherein said initiator is azobis(isovaleronitrile).

24. The process of claim 1 wherein the dispersion of step (c) has a Brookfield viscosity of from about 60 to about 50,000 cps.

25. The process of claim 24 wherein the dispersion of step (c) has a Brookfield viscosity of from about 600 to about 20,000 cps.

* * * * *